Patented Aug. 23, 1927.

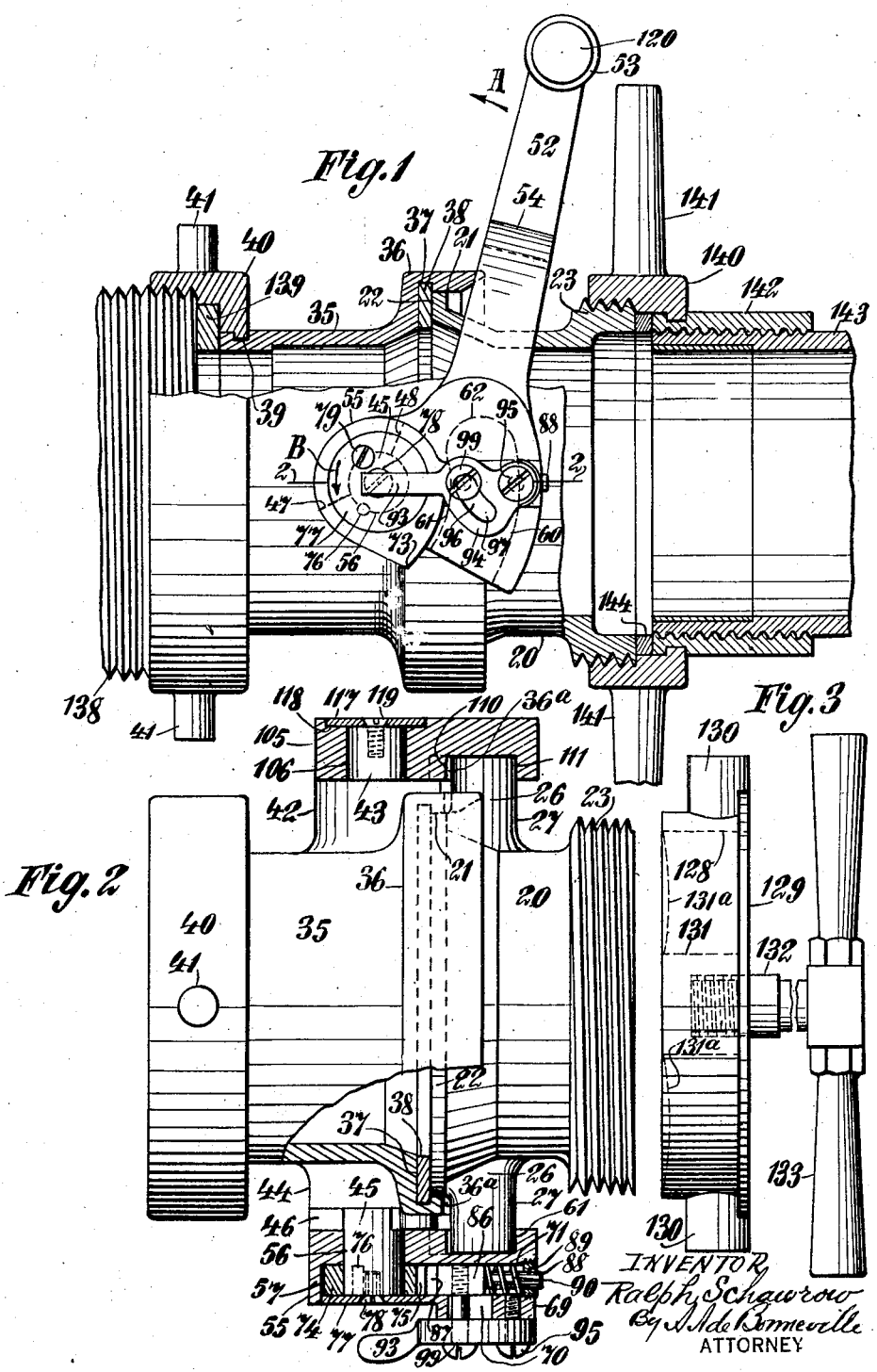

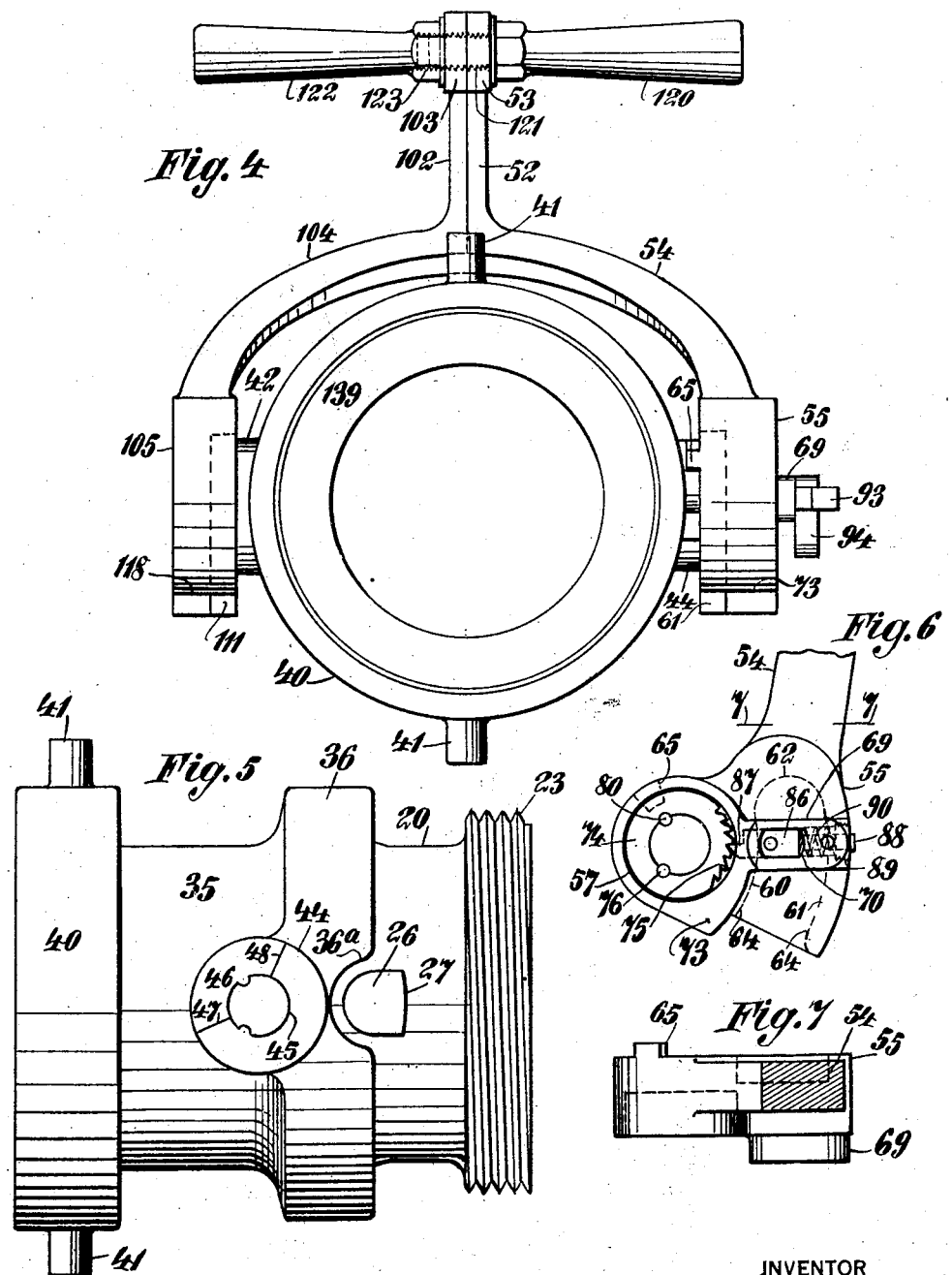

1,639,813

UNITED STATES PATENT OFFICE.

RALPH SCHAWROW, OF BAYONNE, NEW JERSEY, ASSIGNOR TO NATIONAL STANDARD THREADLESS COUPLING CORPORATION, OF ROCKAWAY PARK, NEW YORK, A CORPORATION OF NEW YORK.

HOSE COUPLING.

Application filed June 16, 1925. Serial No. 37,450.

This invention relates to a hose coupling, and is an improvement of the hose coupling described in my Letters Patent No. 1,481,392 dated January 22nd, 1922.

The object of the present invention is the production of means whereby the sections of a hose, or a hose and a stationary nipple and the like are easily and quickly united or separated. The second object of the invention is the production of an improved handle for the locking appurtenances of the coupling. The third object of the invention is the production of an improved supplementary locking device to maintain its locking appurtenances in locked position. A fourth object of the invention is the production of ice breaking means to clear a path for the locking appurtenances of the coupling.

In the accompanying drawings, Fig. 1 represents a side elevation with a partial axial section of an exemplification of the coupling, connected to a hose at one end and a nipple at the other; Fig. 2 shows a top plan view and section of Fig. 1 on the line 2, 2; Fig. 3 indicates a side elevation of a supplemental detail; Fig. 4 is a partial left hand end view of Fig. 1; Fig. 5 represents a side elevation of the members of the coupling with some of the elements omitted; Fig. 6 indicates a side elevation of some details and Fig. 7 shows a top plan view and section of Fig. 6 on the line 7, 7.

The coupling is indicated to comprise the male member 20 and the female member 35.

The male member 20 is indicated with the annular head 21 having the outer bearing face 22 at one end, and the threaded head 23 at its other end. A pair of clamping lugs 26 each with the curved bearing face 27 extend from the said male member 20. The curvature of each face 27 equals the curvature of the walls 61 and 111 to be described.

The female member 35 of the coupling is indicated with the head 36 at one end having the groove 37, for the packing ring 38, which latter may be of rubber. A pair of opposite recesses 36ª are formed in the head 36. The other end of the female member has formed therein the groove 39, for the swivel nut 40. The latter has extending therefrom the plugs 41, adapted to receive a spanner wrench. A boss 42 with the cylindrical journal lug 43, extends from one side of the member 35, and a boss 44 with the cylindrical journal lug 45, extends from the other side of said female member. The boss 44 has formed therein the annular depression 46 with the stop faces 47 and 48.

An operating arm 52 is indicated with the interiorly threaded boss 53 at its swinging end, and the curved portion 54 at its other end. A locking head 55 extends from the portion 54. A cylindrical opening 56 with the enlarged counter bore 57 are formed in one end of the head 55, and a locking cavity with the concentric curved side walls 60 and 61, joined by the curved crown wall 62 are formed in said locking head.

The walls 60 and 61 are formed with increasing radii extending through the axial center of the opening 56, from the crown wall 62 to their other ends 64. A stop lug 65 extends from one face of the locking head 55, which coacts with the stop faces 47 and 48. An extension 69 with an opening 70 extends from the other face of said head 55. An opening 71 is formed in the head 55 which extends to the counter bore 57 therein. A projection 73 is formed with the head 55 adjacent to its locking cavity. A stationary ratchet wheel 74 with the teeth 75 is positioned in the counterbore 57 and is held in place by the dowel pin 76, which locks it to the lug 45. A cap 77 bears on said ratchet wheel 74 and on the lug 45, and is secured to the latter by means of the screw 78. A second screw 79 extends through the cap 74 and is in threaded engagement with a threaded opening 80 formed in both the lug 45 and the said ratchet wheel 74. A locking latch 86 with the heel 87 at one end, and the pin 88 at its other end is slidably located in the opening 71 of the head 55. A nut 89 is in threaded engagement with one end of the opening 71, and has a central opening for the pin 88. A spring 90 encircles the pin 88 and bears between the latch 86 and the nut 89.

An operating handle 93 has formed therewith the body portion 94, which latter is pivoted to the extension 69 of the head 55, by means of the screw pivot 95. A curved guide opening 96 with the lower end 97 is formed in said body portion. The said guide opening gradually approaches the axial center of the screw pivot 95 as it approaches its lower end 97. A guide screw 99 extends through the guide opening 96 and is in threaded engagement with the latch 86.

A second operating arm 102 similar to 52 is indicated with the interiorly threaded boss 103 at its swinging end, and the curved portion 104 at its other end. A locking head 105 extends from the portion 104. A cylindrical opening 106 is formed in one end of the head 105, and a locking cavity with the concentric curved side walls 110 and 111 respectively similar to 60 and 61 are formed in the head 105. A cap 117 bears on the lug 43 and on the counterbore 118 formed in the head 105. A screw 119 extends through the cap 117 and is in threaded engagement with the lug 43 to hold said cap in place. A projection 118 similar to 73 is formed with the locking head 105.

The operating arms 52 and 102 are placed adjacent to each other, to constitute one member. A handle 120 with the threaded shank 121 extends through or is in threaded engagement with the boss 53. A second handle 122 with the interiorly threaded opening 123 is located with one end thereof to bear against the boss 103. The handles 120 and 122 are tightly secured in place by engaging the shank 121 with the threaded opening 123.

Referring to Fig. 3 a cylindrical cap is shown with the annular body portion 128 having the flange 129. Clamping lugs 130 similar to 26 extend from body portion 128. A boss 131 extends from the flange 129, and webs 131ª connect the flange 129, the portion 128 and the boss 131. A stem 132 is in threaded engagement with the boss 131 and has fastened thereto the handle 133. The swivel nut 40 is in this instance shown in threaded engagement with the nipple 138, extending from the water cylinder of the pump of a steam fire engine. A packing ring 139 is interposed between the end of the nipple 138 and the end of the member 35.

A swivel nut 140 with the operating handles 141, is in threaded engagement with the head 23 of the member 20. A sleeve 142 is in engagement with the swivel nut 140 and a hose 143 is fastened to the sleeve 142 in the usual way. A packing ring 144 is interposed between the head 23 and the sleeve 142. To lock the members 20 and 25 of the coupling to each other, the member 20 is located with its outer bearing face 22 against the packing ring 38, the operating arms 52 and 102 having previously been swung to the left in the direction of the arrow A (Fig. 1), from the position shown in said figure, so that the portions of the curved side walls 60 and 61 adjacent their lower ends 64 are adjacent to the clamping lugs 26. The operator at the same time swings up the operating handle 93 in a direction opposite to the arrow B, to disengage the heel 87 of the locking latch 86 from the teeth 75 of the ratchet wheel 74. The operating arms are then swung to the position shown best in Fig. 1 and the wall 61 of the locking head 55, and the wall 111 of the locking head 105 ride on the bearing faces 27 of the clamping lugs 26 and draw the members 20 and 35 toward each other in proper position, and in conjunction with the packing ring 38, a tight joint is made between said members. When the members 20 and 35 have been located in their locked position, the heel 87 of the locking latch 86 is allowed to automatically engage one of the teeth 75 of the ratchet wheel 74, see Fig. 6. By this means the members 20 and 35 are securely maintained in their locked position.

To disengage the members 20 and 35 of the coupling, the operator first disengages the heel 87 from the tooth of the ratchet wheel 74, and then swings up the operating arms 52 and 102 to disengage the walls 61 and 111 from the clamping lugs 26, when said members can be easily disengaged.

During the oscillations of the locking heads 55 and 105, the projections 73 and 118 thereof function as ice breakers of any ice that may be in the path of said heads.

The stop lug 65 coacting with the stop faces 47 and 48 controls the angle of the oscillations of the operating arms 52 and 102.

Various modifications may be made in the invention and the present exemplification is to be taken as illustrative and not limitative thereof.

Having described my invention what I desire to secure by Letters Patent and claim is:

1. In a coupling the combination of a male member and a female member, a pair of journal lugs extending from one of said members, a pair of clamping lugs extending from the other member, a locking head supported on each of said journal lugs, each of said locking heads having a curved wall adapted to coact with one of said clamping lugs, to clamp or disengage the members of the coupling, a ratchet wheel fastened to one of the journal lugs in one of the locking heads, a locking latch slidably supported in the latter head adapted to lock with the teeth of the ratchet wheel, a spring in the latter head bearing against the locking latch to force it into engagement with said ratchet wheel, an operating handle for said latch with one end thereof pivoted to its locking head, said handle having a curved guide opening formed therein, and a guide screw extending from said locking latch through the guide opening in said handle.

2. In a coupling the combination of a male member and a female member, a pair of journal lugs extending from one of said members, a pair of clamping lugs extending from the other member, a locking head supported on each of said journal lugs, each of said locking heads having a curved wall adapted to coact with one of said clamping lugs, to clamp or disengage the members of the coupling, a ratchet wheel fastened to one of the journal lugs in one of the locking heads, a locking latch slidably supported in the latter head adapted to lock with the teeth of the ratchet wheel, means to force the latch into engagement with said ratchet wheel and means to disengage said latch from said ratchet wheel.

In testimony whereof I affix my signature.

RALPH SCHAWROW.